US009569312B2

(12) United States Patent
Taveniku

(10) Patent No.: US 9,569,312 B2
(45) Date of Patent: Feb. 14, 2017

(54) SYSTEM AND METHOD FOR HIGH-SPEED DATA RECORDING

(71) Applicant: Xcube Research and Development, Inc., Nashua, NH (US)

(72) Inventor: Mikael B. Taveniku, Nashua, NH (US)

(73) Assignee: XCube Research and Development, Inc., Nashua, NH (US)

(*) Notice: Subject to any disclaimer, the term of this patent is extended or adjusted under 35 U.S.C. 154(b) by 493 days.

(21) Appl. No.: 13/625,553

(22) Filed: Sep. 24, 2012

(65) Prior Publication Data

US 2013/0091379 A1    Apr. 11, 2013

Related U.S. Application Data

(60) Provisional application No. 61/539,683, filed on Sep. 27, 2011.

(51) Int. Cl.

| | |
|---|---|
| *G06F 11/00* | (2006.01) |
| *G06F 11/14* | (2006.01) |
| *G06F 11/07* | (2006.01) |
| *G06F 3/06* | (2006.01) |
| *G06F 11/20* | (2006.01) |

(52) U.S. Cl.
CPC ........... *G06F 11/1469* (2013.01); *G06F 3/061* (2013.01); *G06F 3/0656* (2013.01); *G06F 3/0683* (2013.01); *G06F 11/0727* (2013.01); *G06F 11/1428* (2013.01); *G06F 11/2094* (2013.01)

(58) Field of Classification Search
CPC . G06F 11/0727; G06F 11/073; G06F 11/1076; G06F 11/1458; G06F 11/1461; G06F 11/1466; G06F 11/1469; G06F 11/2053; G06F 11/2066; G06F 11/3034
USPC ...................... 714/6.1, 6.2, 6.21, 6.3, 42, 54
See application file for complete search history.

(56) References Cited

U.S. PATENT DOCUMENTS

| | | | |
|---|---|---|---|
| 5,414,591 A * | 5/1995 | Kimura et al. ............... 361/695 |
| 6,480,904 B1 | 11/2002 | Kato et al. | |
| 8,086,893 B1 * | 12/2011 | MacFarland et al. ............ 714/3 |
| 2006/0010275 A1 | 1/2006 | Moon et al. | |
| 2007/0101187 A1 * | 5/2007 | Daikokuya et al. .............. 714/6 |
| 2007/0300101 A1 | 12/2007 | Stewart | |
| 2008/0065930 A1 * | 3/2008 | Byrne et al. ....................... 714/6 |
| 2008/0126844 A1 | 5/2008 | Morita et al. | |
| 2008/0172571 A1 * | 7/2008 | Andrews et al. .................. 714/6 |
| 2009/0310242 A1 * | 12/2009 | McLeod et al. ................. 360/55 |
| 2009/0310424 A1 | 12/2009 | Berco | |
| 2012/0266027 A1 * | 10/2012 | Itoyama et al. ................. 714/42 |
| 2013/0117603 A1 * | 5/2013 | Jess et al. ..................... 714/6.22 |

* cited by examiner

*Primary Examiner* — Joseph D Manoskey
(74) *Attorney, Agent, or Firm* — Loginov & Associates, PLLC; William A. Loginov

(57) ABSTRACT

A system and method for high speed data recording includes a control computer and a disk pack unit. The disk pack is provided within a shell that provides handling and protection for the disk packs. The disk pack unit provides cooling of the disks and connection for power and disk signaling. A standard connection is provided between the control computer and the disk pack unit. The disk pack units are self sufficient and able to connect to any computer. Multiple disk packs are connected simultaneously to the system, so that one disk pack can be active while one or more disk packs are inactive. To control for power surges, the power to each disk pack is controlled programmatically for the group of disks in a disk pack.

21 Claims, 13 Drawing Sheets ated. When there is a need to ship the data and disks to another location the cable is unplugged from the box, and the units can be moved without the RAID controller or the computer attached. This enables the shipping of the disks from one location to another, the replacement of the disks by a new set. Disk pack units can be easily moved in and out without any cumbersome operation. When the disk pack unit is connected to a new RAID controller, it does not require the RAID controller to be in every respect identical to other RAID controllers. The disk packs can be plugged into any compatible computer regardless of hardware version, operating system version or file system version. This dramatically improves interoperability and portability.

SYSTEM AND METHOD FOR HIGH-SPEED DATA RECORDING

RELATED APPLICATIONS

This application claims the benefit of U.S. Provisional Application Ser. No. 61/539,683, filed Sep. 27, 2011, entitled HIGH SPEED DATA RECORDER, the entire disclosure of which is herein incorporated by reference.

STATEMENT REGARDING FEDERALLY SPONSORED RESEARCH OR DEVELOPMENT

This invention was made with U.S. government support under Grant "A high speed data recorder for space, geodesy and other high speed recording applications," NASA Case No. GSC-16481-1, NASA Contract No. NNX11CE92P. The government has certain rights in this invention.

FIELD OF THE INVENTION

The present invention relates to high speed data acquisition and recording.

BACKGROUND OF THE INVENTION

In the area of high speed data acquisition there has been a tradition of producing custom computing hardware solutions for recording bursts of data into buffer memory (for short bursts at high data rate) and custom storage solutions for storing this data to disk subsystems. In many cases impressive speeds are achieved for short bursts, but continuous operation at high data rate has been lacking Other systems such as the Conduant Mark 5 series have a custom hardware design connected to a special purpose disk array designed for continuous average rate recording.

Most solutions have been hardware centric with limited flexibility, large size and very costly to develop. Today it is possible to use software centric maintainable solution to high speed acquisition and data storage, by solving a limited set of challenges.

In order to efficiently collect large amounts of high speed data multiple storage devices in parallel are needed. Today these devices are computer hard drives with rotary or solid state device (SSD) media. The common theme is that there will be multiple such devices needed in order to store the data either limited by volume or by data rate. A fast rotary media disk can sustain data rates in the order of approximately 100-150 MB/s while a SSD can sustain 200-400 MB/s. With high data rates of several GB/s multiple drives in parallel are employed.

When recording large sets of data in the field, data needs to be shipped from the location of collection to some other location for processing. Common recording systems on the market, for example as shown in FIG. 1, use an internal RAID-based disk array 110 (often hot swappable for ease of maintenance) attached directly to the recording unit chassis 100 of the computer and collection equipment. According to the prior art embodiments, when disks needs to be replaced or maintained, the disks 111, 112, 113, 114, 115, 116, 117, 118, 119, 120 either need to be removed individually from the chassis (and put back in the chassis at the receiving site in the same order) or the entire chassis need to be shipped. Shipping the entire chassis in most cases becomes prohibitively expensive. More particularly, because RAID controllers are notoriously particular with respect to hardware and operating system version, any receiving site typically requires the exact same instantiation of the RAID controller/operating system. This can be problematic, especially if one of the computers has undergone an update to its hardware of (more typically) software.

Furthermore, when streaming data at high data rate to disks, the traditional solution has been to use a RAID (redundant array of independent disks) subsystem to group multiple disks together and increase the total bandwidth. Current commercial RAID systems can theoretically, on paper, achieve disk speeds up to approximately one GByte per second of transfer rate. Then multiple such RAID subsystems can potentially be run in parallel to achieve multi-GByte per second transfer rates. This is a common practice however there are at least two major drawbacks with this approach.

The first problem is that if a disk within a raid set has a problem (for example a write error, timeout, or it is slower than the others) the entire raid set slows down until the problem is corrected. If a disk breaks down the raid slows down into a fall back mode and thus destroys the performance of the whole set. In lab tests a 1 GByte/s Raid slow down has been observed to a few hundred MByte/s when there has been a fault on one out of 16 drives (disks) in a set.

The second problem is that moving the disks from one system to another is difficult to do. The file system on the disks is vendor, card, and version on the card firmware specific. Accordingly, the controllers on all machines that are able to read the data from a specific disk pack must be identical. This requirement sets severe limitations on portability, and possibilities for upgrading systems across multiple sites.

There are several challenges when performing high-speed recording of continuous data streams. It is generally desirable to provide a high speed data recorder that is reliable, resilient, cost effective and maintainable, as well as providing continuous operation with minimal human intervention.

SUMMARY OF THE INVENTION

This invention overcomes disadvantages of the prior art by providing a reliable, resilient, cost effective and maintainable high speed data recorder and replay equipment. This equipment is used, for example, in a deployed environment or a high altitude operation, such as aircraft, helicopter, car, troop transports, trucks, terrain vehicles, computer rooms, high altitude observatories, as well as continuous operation with minimal human intervention. This invention addresses major challenges in using off the shelf hardware to enable a software based approach to high-speed recording of continuous data streams in a deployed environment with large amounts of data. The resulting system is software defined, and can run on most current hardware platforms and is easily portable to future platforms.

An external disk pack unit is provided together with minimal infrastructure around the disks to perform high-speed recording. A shell is provided, having a convenient case for the disks to be mounted in for handling and protection), cooling for the disks, and connection for the power and disk signaling. This optimizes the cost of the device while enabling the boxes (i.e. disk pack units) to be self-sufficient and able to connect to any computer, while providing the performance desired.

In accordance with an illustrative embodiment, an off-the-shelf connector is employed. A cable (typically a four-lane SAS/SATA cable, which effectively lowers cost and increases maintainability) is connected to the fixed unit (typically the recorder) and the disk pack units are attached to the cable, thereby minimizing the number of insertion events. Accordingly, standard wear and tear results in only the cable itself needing replacement. This removes the need for custom connectors, and reduces the cost and effort to use the system over time. Moreover, and desirably, with standard cables the system can be made free of a costly custom backplane, reduces the size of the recorder chassis itself and renders maintenance (i.e. replacement of worn out connectors) a task that can easily be performed in the field by an ordinary technician, rather than requiring that the recorder be shipped to a manufacturer for maintenance According to the illustrative embodiment, by employing a set of "independent" off-the-shelf disks with standard file-system and a disk-write scheduler, almost linear performance increase is observed by increasing the number of disks. Further, disks can be read by any suitable computer, slow or faulty disks have minimal impact on total system performance, disks of different type and speed can be used together, and there is no explicit ordering of the disks needed.

In an illustrative embodiment, packet size mismatch is addressed by bundling many small packets from the input side into larger packets suitable for writing to disk when within the stream buffers. Providing large buffers in recorder memory allows the system to record at maximum machine speed to memory and trickle data (in suitable chunks) out to a disk array at an average speed. This approach of using large memory buffers and knowledge of how disk drives operate (in general) allows the use of a superior and more portable storage scheme. Notably, any disk drive can be used, and/or a combination of different disk drives can be used in the array of disks. In addition the storage computer's operating system and the native firmware of the disk drive (i.e. the drive vendor's firmware) manages the details of data transfers, while the illustrative system and method optimizes the overall dataflow. An off-the-shelf operating system is employed to address operating system interference, hardware driver availability and increase responsiveness of recording capability. The systems and methods ensure that the buffer storage is always available in main memory, thereby preventing the buffers from being swapped to the disks.

Notably, the illustrative decoupling the input streams and packet sizes of the streams from the number of streams and packet sizes of the output streams enables the system to optimize its handling of both sides. More particularly, on the streaming output to disk, the packet sizes can be chosen so as to optimize the performance of each individual disk. In general, this "optimal" packet size depends on the disks seek time, the write speed of each track as well as the write cache size of the disk. By choosing a write buffer size slightly less than the size of the cache of the disk a disk-write can be completed substantially "immediately" without a delay while the disk completes the transfer to the platters. This enables the system to move on and write to the next disk without delay. Another "optimal" operation point is to chose the buffer size to be large enough, so that the time to write the buffer to disk is "large" compared to the seek time of the disk. For example, a disk with a seek (plus other overhead) time of 10 ms, and a disk write speed of 100 MByte/s typically requires a buffer size of 10 MByte to have a ~10% seek overhead. A larger buffer size thus decreases the overall "seek" overhead, but increasing the size to larger than the cache size of the disk, would then cause the system to have to wait for data transfer completion and thus incur overhead on the recorder side. In a multithreaded system and disk controllers capable of maintaining multiple transfers at the same time, it may be beneficial to increase buffer size to even larger chunks, to decrease the seek overhead. With modern disks, having 16, 32, 64 MB and larger cache size the seek overhead can be kept low while still not having buffers larger than disk cache.

In high altitude operation, in accordance with an illustrative embodiment, a pressure switch and miniature compressor can be employed to regulate and maintain appropriate operating conditions for the drives. Using the compressor also relaxes the requirement for how much leakage from the box is acceptable. This likewise reduces the cost and complexity of the disk pack unit. Moreover, by containing the disks in a separate enclosure (box), rather than inserting disks into a recorder chassis, pressurization of this smaller enclosure with disks is more straightforward and cost-effective than attempting to pressurize a larger enclosure that also contains the processing components. Additionally, the pressurization of a large enclosure containing processing components, cables, and the like, requires substantially more cooling resources. Advantageously, the cooling of an illustrative disk enclosure typically requires only is 80-160 W while the cooling of the overall system can require up to 1 kW or more. In an illustrative embodiment, the relatively small size of the enclosure and limited power dissipation, allows the use of a fairly small ("tiny") embedded compressor within the disk enclosure (generally less costly and easier to operate) than a compressor required for a large enclosure/system. Moreover, by providing a "leaky" enclosure with "active" pressurization (enabled by the small size of the illustrative disk enclosure), any sealing requirements can be relaxed. In other words, gaps and vents can be provided in the enclosure to allow it to "leak" slightly with pressurized air. Advantageously, this allows for less costly connections by allowing conventional cables pass through the enclosure sides (without aggressive sealing, and potentially with small gaps. Also, the enclosure requires less costly sealing options to be used, thereby allowing the enclosure to be smaller, less costly, and more efficient. This generally improves the illustrative system's operational efficiency.

In an illustrative embodiment, a system and method for system for high speed, high-volume data storage from a data source more particularly comprises an array of disks interconnected controlled by a scheduler. This scheduler assembles and directs streaming write of data packets to each of the disks across the array at a high speed as disks become available to receive the data packets. A control computer is provided, and includes an operating system and a file system that interacts with the scheduler. Illustratively, the controller connected by cables to the array of disks. More particularly, the scheduler is constructed and arranged so that, in presence of a failure of at least one of the one of the disks, writing of data continues to other unfailed disks of the array free of any influence on write performance of the other unfailed disks by the failed disks. The array of disks can include at least one disk having at least one of (a) a differing size and (b) a differing write performance with respect to another disk of the array to define an arbitrary collection of disks in the array. In this manner the scheduler and associated file-writers manage differences in performance of disks in the array, so that if a disk is slowed by failure or other issues its failure is does not generally affect the performance of the other disks, as the disk scheduler accounts for this failure by redirecting streams of write data o the other disks in the array (typically shutting down the failing disk). Illustratively, in accordance with this arrangement, the streaming performance of the disk subsystem is close to the aggregate of the performance of all individual disks. The scheduler effectively handles each disk individually, and breaks up the input data stream into the stream buffers. Thus, the incoming stream is essentially multiplexed using stream buffers over any number of individual disks, and the individual performance of each disk is decoupled from the performance of all other disks. Note that this scheduling technique can also be applied to other "streams" in addition to a storage arrangement. An example of such a scheduled stream is the transmission of data over an arbitrary number of network connections and reassembling such data on the receiving side of the network.

Illustratively, each of the stream buffers is constructed and arranged to vary so as to buffer sufficient data for write to each of the disks in the array in a manner that an input data stream from the data source is fully written to the array irrespective of input data stream size. The stream buffers can, more particularly, be constructed and arranged to buffer the data stream in bursts of larger data stream size for a burst time interval in which a time before and after the burst time interval are defined by a smaller data stream size. Notably, by using an arrangement of "elastic" stream buffers certain advantages can be achieved. That is, by using a sufficiently large stream buffer, the variability of the output stream can be decoupled from the input stream. Thus, the input stream can be handled in real time at whatever rate and determinism is desirable from that side and the output stream can be handled by whatever scheme is desirable on the output side (for example size of packets, the required latency to write, variability in latency). Additionally, the number of output streams, compared to the number of input streams, is independent. Thus, the timing characteristics of the input are completely independent of timing characteristics of the output. The size of buffers is selected to be sufficiently large to accommodate any differences between input and output.

Illustratively, the stream buffers can be adapted to cache the data stream within a predetermined time interval and write (trickle) the data to the array in a second, longer time interval. This enables "bursty" operation, which often occurs in various streaming data arrangements when large volumes of data arrive at intermittent intervals with significantly slower data flow at times therebetween—for example, bursts arrive at 8 MB/s, but only for about 50% of the time. The stream buffers store the bursts and then smooth out the output to an average of 4 MB/s. In general the stream buffers can be constructed and arranged to cache at least approximately 1 GByte of data to provide sufficient performance in the illustrative embodiment, but larger or smaller cache sizes are expressly contemplated.

Illustratively, (on the array-read side) the scheduler provided to an associated control computer is constructed and arranged to enable reading the disks in parallel to the stream buffers and, at an output of the stream buffers, assemble the data stream therefrom so as to read the assembled data stream. This reading of the assembled data stream can occur at a speed that is based upon an aggregate speed of all the disks in the array. In reading data packets, the scheduler is constructed and arranged to use identifiers (e.g. a packet number or timestamp or any other method to mark the data packets so they can be reassembled by a scheduler) associated with the data packets from write, and to reassemble the data stream therefrom. Thus, the system and method can "replay" the stored data at an "arbitrary" speed close to the aggregate speed of all individual disks that the stream is stored on, by reading from the disks in parallel to the stream buffers and assembling the original stream. This process, in essence operates the write system in reverse.

BRIEF DESCRIPTION OF THE DRAWINGS

The invention description below refers to the accompanying drawings, of which.

DETAILED DESCRIPTION

Reference is now made to FIGS. 2-13 showing various illustrative embodiments of the present invention. FIGS. 2-5 reference the overall operation of the high speed recording system. FIGS. 6-12 show various illustrative arrangements of components and FIG. 13 describes the overall logical design flow of the paths for recording data and control of the data.

Storage System Packaging Overview

Figure 1:
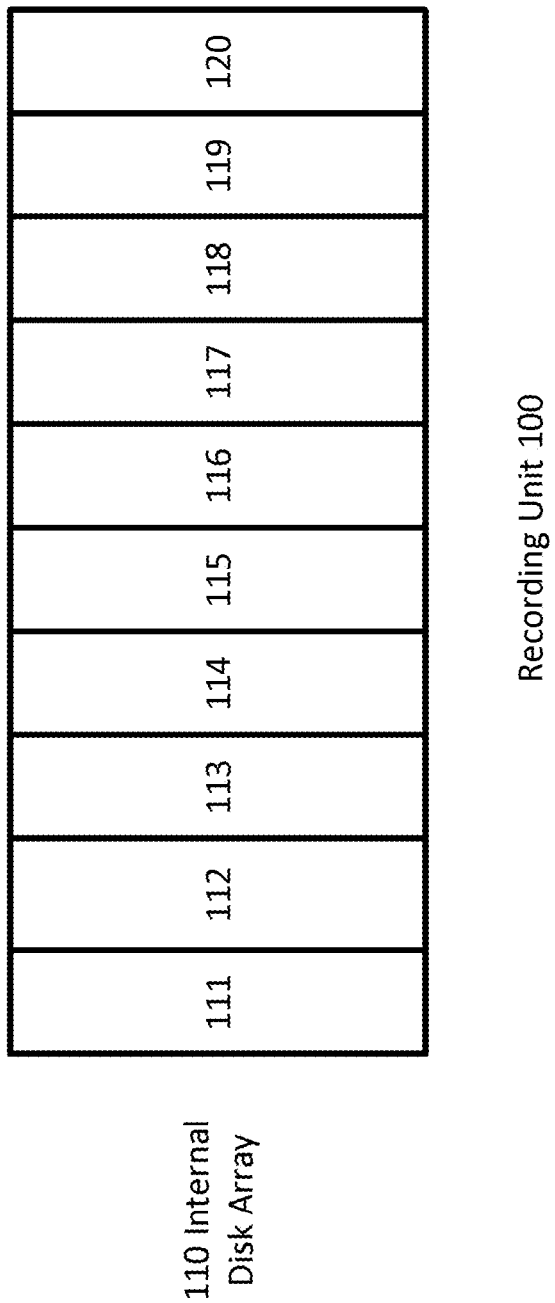
FIG. 1, already described, is a block diagram of a high speed storage system, in accordance with the prior art.
Figure 2:
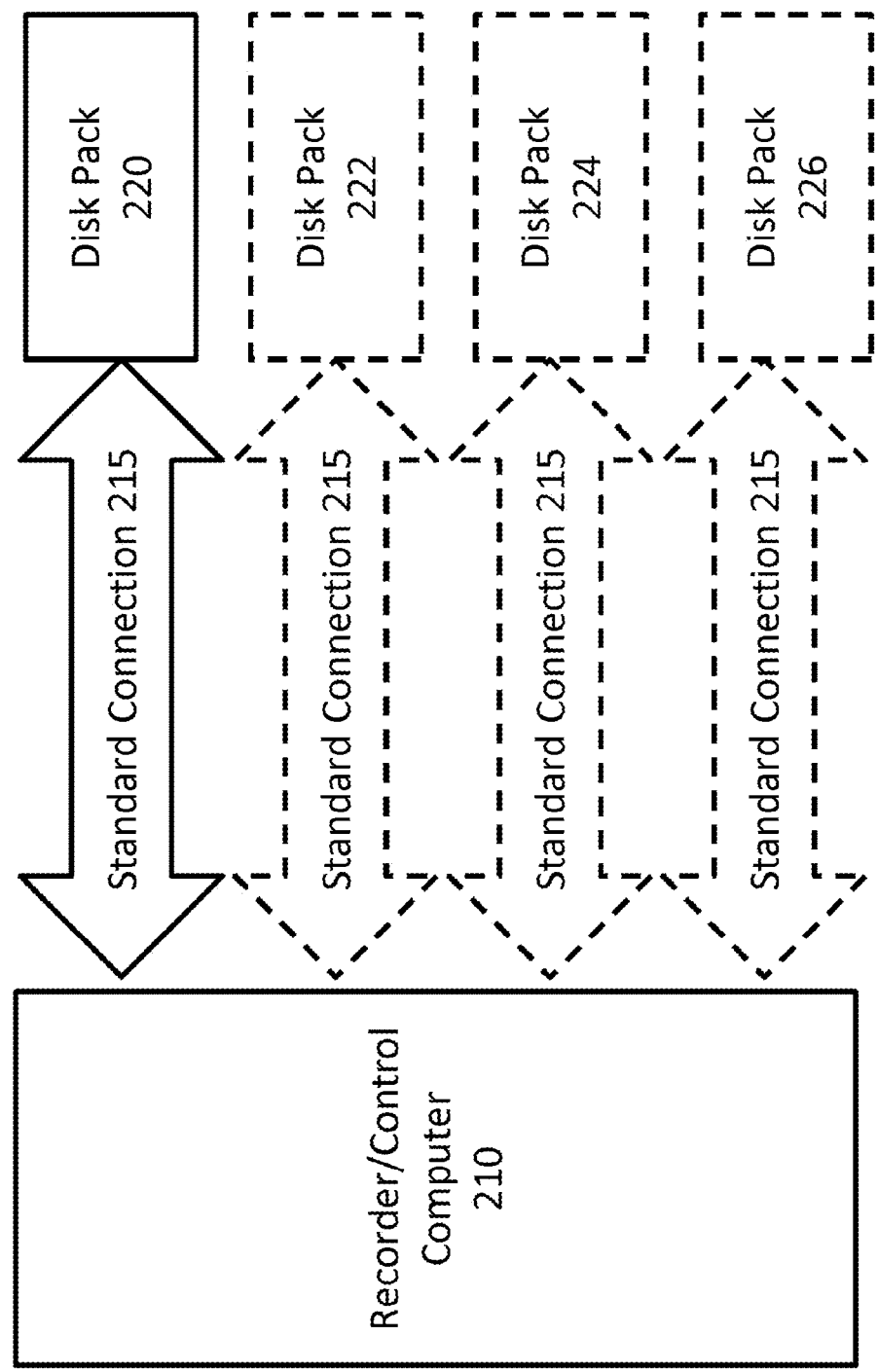
FIG. 2 is an overview block diagram of a system for high speed data recording according to an illustrative embodiment.

With reference to FIG. 2, the overall system 200 for high speed data collection is shown. The control computer 210 (typically a recorder) is connected through a standard connection 215 to at least one disk pack 220. For the purposes of this illustrative embodiment, the disk pack is external to the control computer, and connected via cabling. However, the disk pack can be internal to the control computer and connected by appropriate cables to internal connectors in an alternate embodiment that is expressly contemplated herein. The depicted disk pack 220 contains individual disks (typically 8-16 disks, rotary or SSD, up to 32 disks or even more) together with minimal infrastructure around the disks. The standard connection 215 allows for disk signaling (though multi-lane SAS or SATA connection). A separate power cable (nor shown), which can be conventional, is operatively interconnected to either the control computer's power supply or a separate power supply. The control computer 210 has a plurality of connectors for allowing the standard connection 215 between the control computer 210 and at least one disk pack 220. The use of a standard connection 215 also allows several disk packs 220, 222, 224, 226, up to an unspecified number of disk pack units (i.e. limited only by the number of available SAS/SATA connectors on the motherboard (or other peripheral) or the control computer and the collective ports on any added disk controller cards), to be connected to the control computer. Additionally, by using standard connections to connect the fixed unit (control computer or recorder) to the disk packs, the number of insertion events for the recorder is minimized. In operation. The cable is inserted once, and moved just a few times.

By using an off-the-shelf connector (i.e. rated for 100 or more insertions), the cost is significantly reduced, as well as the complexity of the overall system. Furthermore, the disk packs themselves do not need to be inserted as frequently, since they are replaced and most often shipped to another location for processing. Many of the existing prior art recording applications require the disks to be exchanged multiple times a day and over the lifetime of a system, there can be thousands of removal/insertion events. The common solution in the industry has been to employ custom (and very expensive) connectors that are designed to withstand these cycles. However, this requires custom connectors and a chassis designed specifically for that purpose. When such connectors break or require replacement due to wear, it is a large task to disassemble the recorder and replace internal parts. In general this task typically requires skilled personnel and electrostatic discharge (ESD) protection, adding to costs and complexity. By using a cabled interconnect 215 to an external disk box 220 (222, 224 or 226), the multiple insertion problem is solved. Furthermore, the only piece of equipment that should need replacement is the cable itself, when the number of insertions has been reached. The use of standard connections removes the need for custom connections and reduces the cost and effort to use the system over time.

By replacing a custom backplane with a cable solution, off-the-shelf connectors and cables (for example SAS/SATA) can be employed, thus enabling the disk packs to be used in off-the-shelf computers without custom hardware. Furthermore, a standard disk controller can be used without modification, again advantageously decoupling the implementation from function. Likewise, the use of a conventional file system (e.g. EXT4 and/or NTFS) further adds to the ubiquity of the overall system. There are several advantages to his approach, including that there is no need for hardware lock-in, and no need for custom-designed infrastructure components. This ensures that the system will be robust against hardware changes. That is, the illustrative system enables the use of commercial hardware components as well as software such as an off-the-shelf operating system (e.g. Linux, Windows®, etc.), since the system is generally free of reliance on internal details of how such operating systems function. Conversely, these conventional file systems merely provide the base service of a file-system and a conventional mechanism to read and write disks, without the need to instantiate custom file service processes. Likewise, the input data streams can rely on the function of the conventional file system. The illustrative buffering mechanisms and schedulers of the embodiment provide the specialized functionality (under the file system) to allow the system to meet real-time and streaming requirements.

Additionally, the cost of replacing connectors is reduced significantly by using a simple connect/disconnect of the cables, as compared to replacing a custom backplane, which requires disassembling the entire machine. Finally, a standard computer (desktop, laptop, Apple Corporation iPhone®, iPad®, other "smart" phone, tablet computer, or other computing/interface device) with a suitable controller (external SAS/SATA for example) can be used to access the disk packs without requiring ("free of") custom hardware.

Figure 3:
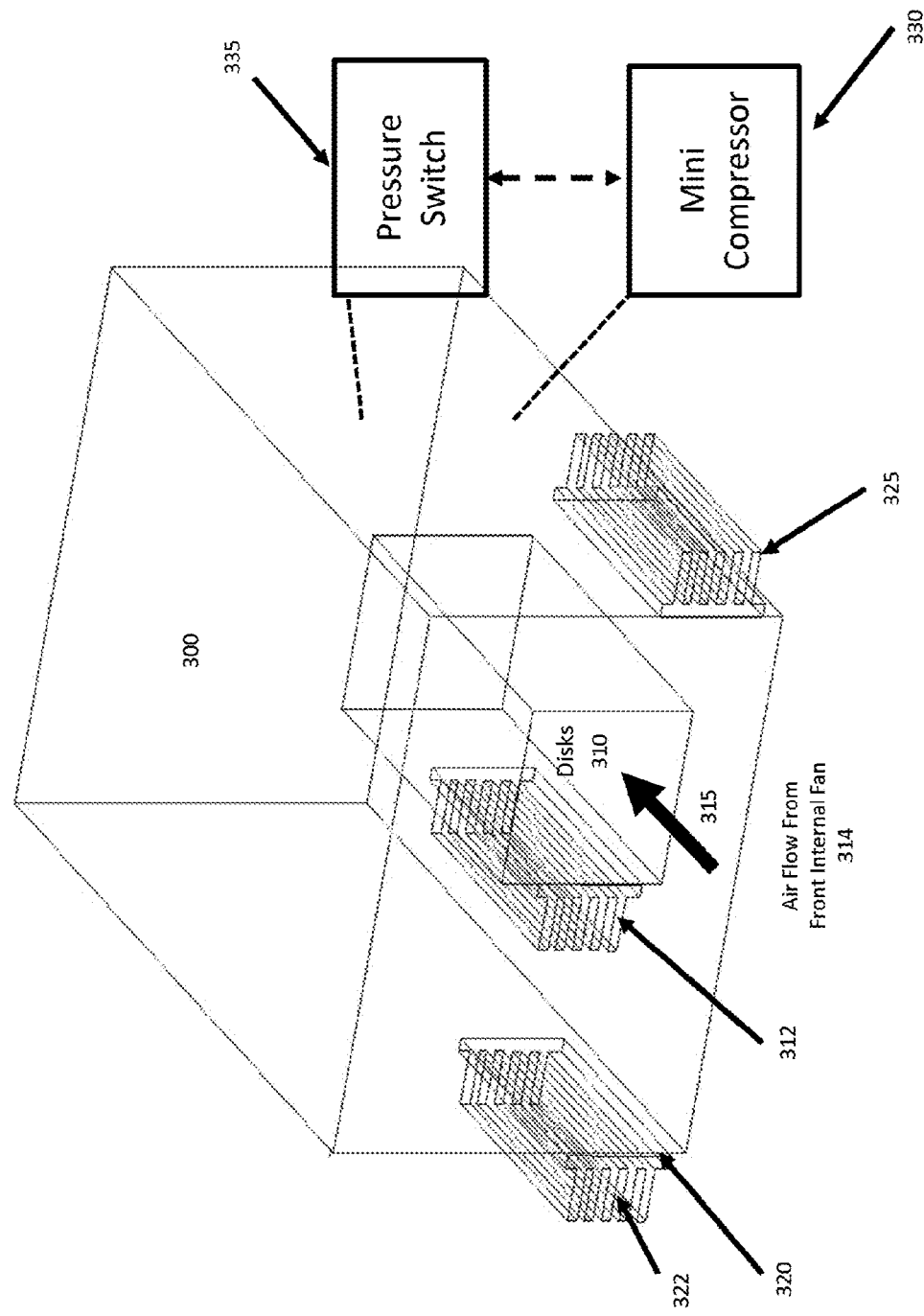
FIG. 3 is a schematic diagram of a disk pack unit for high speed data recording, in accordance with the illustrative embodiment.

With reference to FIG. 3, each disk pack unit 300 includes a disk pack group 310 with an associated (optional in the case of high altitude operation, described below) heat sink 312 for cooling of the disks. Air from the front internal fan 314 (fan 615 shown in FIG. 6 for example) is directed into the disk pack unit 300 via arrows 315 to provide the desired airflow throughout the disk pack unit 300. An aluminum base plate 320 is also provided for another heat sink 322 to dissipate heat from the unit 300. Another heat sink 325 is also provided for cooling of the disks. The disk pack unit is sealed to prevent undesired infiltration of outside substances. And the unit can also be liquid cooled in other embodiments.

By providing a unit with internal cooling infrastructure, the size of the unit can be small, inexpensive and self-sustained. Cooling is typically an issue with traditional multi-disk packs and the common solution is to insert them into a larger chassis for cooling and power. However, this approach requires custom chassis, which become large and costly, and the disk pack also exposes the disks for the external cooling to work, and thus protection of the disks is compromised. The unit 300 including the cooling infrastructure uses external power and external connections for the disks to the computer (i.e. recorder) equipment. This optimizes cost of the device while enabling the units to be self sufficient and able to connect to any computer to achieve the desired performance. There is no need for a custom chassis for the disk packs, and the packs can connect to any computer with a suitable disk controller.

High Altitude Operation

With the unit 300 internal fan providing the desired airflow for the disks, the unit 300 can be made with a passive heat exchanger that transfers heat from the pressure side of the box to the external side (not shown but readily apparent to those having ordinary skill). More particularly, as shown in FIG. 3A, air is circulated through the disk pack and then moved through a heat exchanger. In an embodiment, a basic heat exchanger comprises a heat sink mounted onto both the inside and outside of the box. The inside heat sink draws heat from the airflow through the disk pack and transfers it to the heat sink on the outside via a thermal connection through the box. In an embodiment, two heat sinks are mounted on opposite sides of the box (e.g. one on the pressurized side and the other on the non-pressurized side). In an alternate embodiment, an air-to-fluid heat exchanger (e.g. liquid cooling) is located on the inside of the box. This transfers heat to the coolant liquid, which is in turn transferred to an external heat exchanger.

By employing a recording system with the control (recording) computer and the disk packs being separated, and using a solid state disk (SSD) for operation of the recorder, the recorder itself does not need a pressure box. In a high-altitude embodiment, in order to maintain pressure, a pressure switch 335 and miniature compressor 330 can be employed to regulate and maintain appropriate operating conditions for the drives. Using the compressor 330 also relaxes the requirement for how much leakage from the unit 300 is acceptable. This further reduces the cost and complexity of the unit 300. Typical prior art systems require use of a pressure box at high altitudes, which is not required by the illustrative embodiment. In operation, the compressor builds up the pressure in the box to a safe operating altitude, before it allows the disks to start (typically 10,000 ft to 12,000 ft above sea level, or lower). Once a safe operating pressure has been attained within the box of approximately 0 ft to 10,000 ft above sea level, the compressor operates to maintain this pressure during disk operation. In an illustrative embodiment, and additional safety switch is provided to allow graceful shutdown of the disks if pressure decreases below a predetermined limit. An overheat switch can also be provided for the compressor if excessive leakage from the box is experienced.

Streaming Disk Performance

Figure 4:
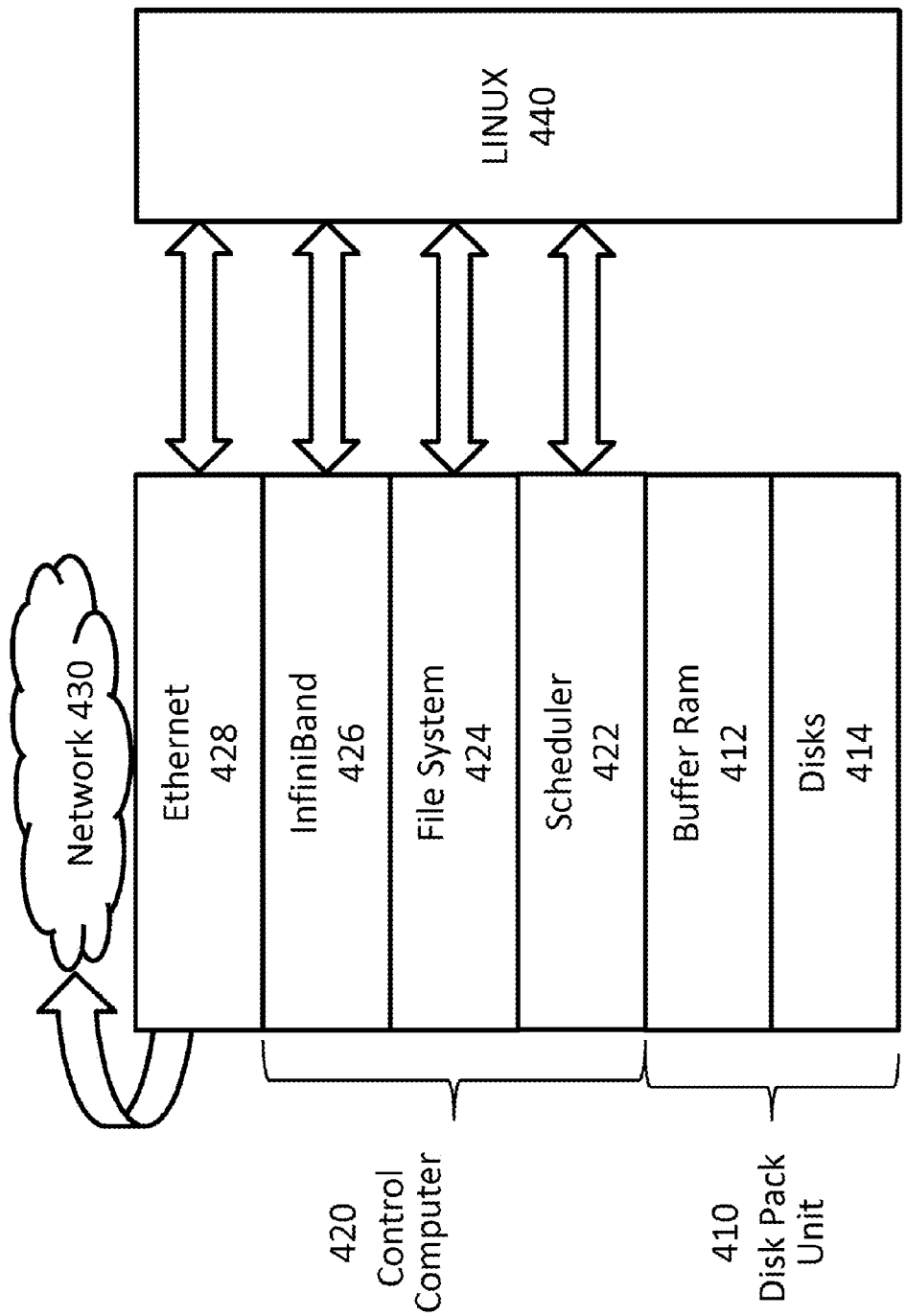
FIG. 4 is a block diagram of the overall system structure and the various layers of operation, according to the illustrative embodiment.

To achieve reliable streaming disk performance, as well as portability across multiple systems and machines, standard protocols (such as SATA/SAS) are employed and a standard file system (for example EXT4, NTFS). Reference is now made to FIG. 4 showing a block (stack) diagram of the overall system structure 400 and the various layers of operation, in accordance with the illustrative embodiment. The individual disks 414 of the disk pack unit 410 each include a buffer ram (cache) 412, depicted as a layer of the stack 400, but residing conventionally within each of the disks. The control computer 420 includes a scheduler 422, a standard file system 424 and a connector, such as an Infiniband connector 426. An Ethernet connection 428 is provided for the control computer 420 for communication with a network 430. More generally, and by way of example, an internal command interface, an external machine-to-machine communication link or web browser can be employed to control the system. The network can comprise a local area network (LAN), wide area network (WAN), WiFi, wireless network, the broad worldwide Internet, or any other network known in the art. The control computer 420 interface is controlled by a Linux 440 or other standard operating system. By using standard disk protocols and standard file systems, and by running the disks 414 individually in parallel, each disk is independent and individually accessible by the recording units. By running the disks individually in parallel, instead of in a RAID set or group, each disk is independent and individually accessible. Generally, this ensures that the system's streaming performance is not compromised, for example, by RAID hardware. Furthermore, many of the problems associated with a RAID style recording system, as described hereinabove, are overcome through the user of the standard disk protocols, file system, and connection set up, as employed by the illustrative embodiments Illustratively, each disk can be managed independently of any other disk in the system according to the scheme of the present embodiment. Thus, by way of example, if one disk is slower or experiences problems this/these issue(s) do not affect performance of any other disk in the system. It is also contemplated with this scheme that "any" combination of disks can be used at the same time and that the system performance will be approximately ("roughly") the aggregate of each individual disk, subtracting disk-management overhead and scheduling. Schemes such as hot-spare and duplication of data for redundancy can be employed if desired, but are not required in the embodiments herein.

Figure 5:
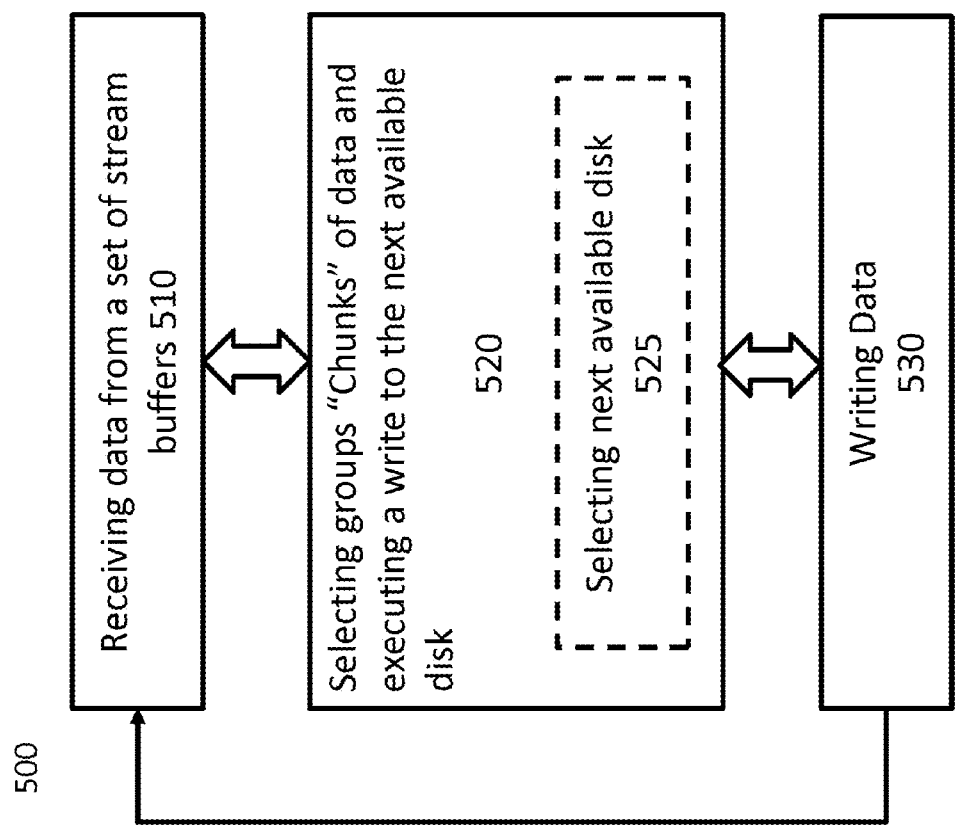
FIG. 5 is a flow chart of a procedure for reliable streaming disk performance in accordance with the illustrative embodiment.

The disks 414 are controlled by a software disk scheduler 422. The scheduler works in accordance with the flow chart of FIG. 5 showing a procedure 500 for reliable streaming disk performance in accordance with the illustrative embodiments. The procedure 500 commences at step 510 by receiving data from a set of stream buffers (i.e. buffer ram 412) where the incoming data is placed by the data acquisition processes. The scheduler then takes large groups (or "chunks") of data and executes a write to the next available disk at step 520. The large groups of data are desirably tuned to (or slightly smaller than) the attached disks write cache. The step of selecting the groups of data and executing a write to the next available disk also includes the step of selecting the next available disk 525. The selection of the next available disk can be performed in accordance with any algorithm within ordinary skill, or the specific embodiments described herein.

Selection of Next Available Disk

The selection of the next available disk can be performed according to multiple selection processes, depending upon the desired outcome. One possible option for maximum throughput is to allow the disks to operate in a "First Available" mode. In the First Available mode, there is a queue of disks ready to receive data (and a set of busy disks). When a disk is "ready" with a write operation, it inserts itself at the end of the ready-queue and waits for the scheduler to send the next block of data for the disk to write. This will (on average) give slower disks less data to write, by allowing faster disks to pass the slower disks in the ready-queue. In operation, if a disk has write problems, only that individual disk is slowed down. The other disks simply pass by it when getting into the ready-queue. Another process is to distribute data evenly among the disks, regardless of performance or other operating parameters. Notably, this is a significant advantage compared to a RAID solution wherein the entire RAID group (disks belonging to the particular RAID arrangement) are collectively slowed. For example, where a RAID group includes ten drives, and one drive exhibits trouble, this affects all ten disks in the group, since the group must stop and reconstruct. RAID reconstruction typically causes a significant decrease in the performance of the group. Conversely, in the illustrative system of the embodiments, a ten-disk array with one problematic disk would result in one offline (or slow) disk (the troubled one) while the other nine disks continue to operate at full efficiency. Thus, then illustrative system would lose a maximum of approximately 10% of total performance (i.e. 1/10) as opposed to losing up to 80% of performance in the RAID example (depending at least in part on the characteristics of the RAID controller).

A third process for selecting of next available disk is to start writing at the end of a disk (which is slower than in the beginning) on half of the disks, for example, and by doing so, the same total disk performance across the entire disk capacity is achieved. Yet another process for selecting the next available disk is the use of a "hot-spare" disk that normally does not receive any data, unless something bad happens to the others and overflow can be put on the spare disks for later recovery. Many other schemes can be employed within the level of ordinary skill, with the full flexibility of where to write a particular piece of data, so long as the disks are independent units working in parallel.

There are several advantages to providing a set of independent disks with their own individual file systems. First, there is almost linear scalability, and the total performance increase with the speed of each additional disk. Second, any combination of disks can be used. There is no need to use the same type of disks for the entire array. In fact, the disks do not even need to have the same file-system on them. In accordance with the illustrative embodiments, for example, NTFS and ext4 disks can be combined into a single disk pack. Disks can also have different sizes and different performance. Third, a slow or faulty disk will only affect the performance of the array, with the loss of the disk having the problem, without affecting anything else. Finally, since each of the disks is independent of each other and supports a standard file-system, there is no need to have the disks in any particular order. They can be read by "any" appropriate disk controller regardless of the brand and revision. The files captured by the recorder software only need enough information to reassemble the files created across the set of disks.

Furthermore, fault tolerance and redundancy can be addressed in a way most suitable to the needs of the application, for example hot spare disks, overflow disk of temporary faults, over-capacity of single array to accommodate a suitable set of errors. The illustrative embodiments can also address redundancy by writing the same block to two or more disks essentially creating a RAID 1 solution. It should be noted that a common misconception with respect to redundancy and disk failure in the case of recording is that RAID is necessary for safely capturing data. However, it is understood in the art that most disks failures are not instantaneously catastrophic. Rather, in the illustrative embodiments, the system employs a process in which write, seek and read errors are detected and tracked, and in doing so, a disk that is starting to have problems experiences a preventative shutdown. By way of example, such preventative shutdown can occur when seek times becomes excessive, or when write errors start to occur. If shutdown occurs early in the disk's troubled behavior there is a significant probability of reading already-written data off the disk at a subsequent time. Thus, preventatively (and gracefully) shutting down a troubled/failing disk using the system software actually decreases the need for a proper RAID system. This all serves to desirably and significantly increase recording speed, particularly where a drive is failing/failed. Note that for the purpose of this description, the term "failure" in relation to the operation of a disk should be taken broadly to include any degradation in read or write performance that exceeds a predetermined threshold, either suggesting imminent complete operational failure of the disk or a circumstance that causes the disk to be written to more solely or less efficiently than desired in view of overall system performance.

Disk Pack Unit

Figure 6:
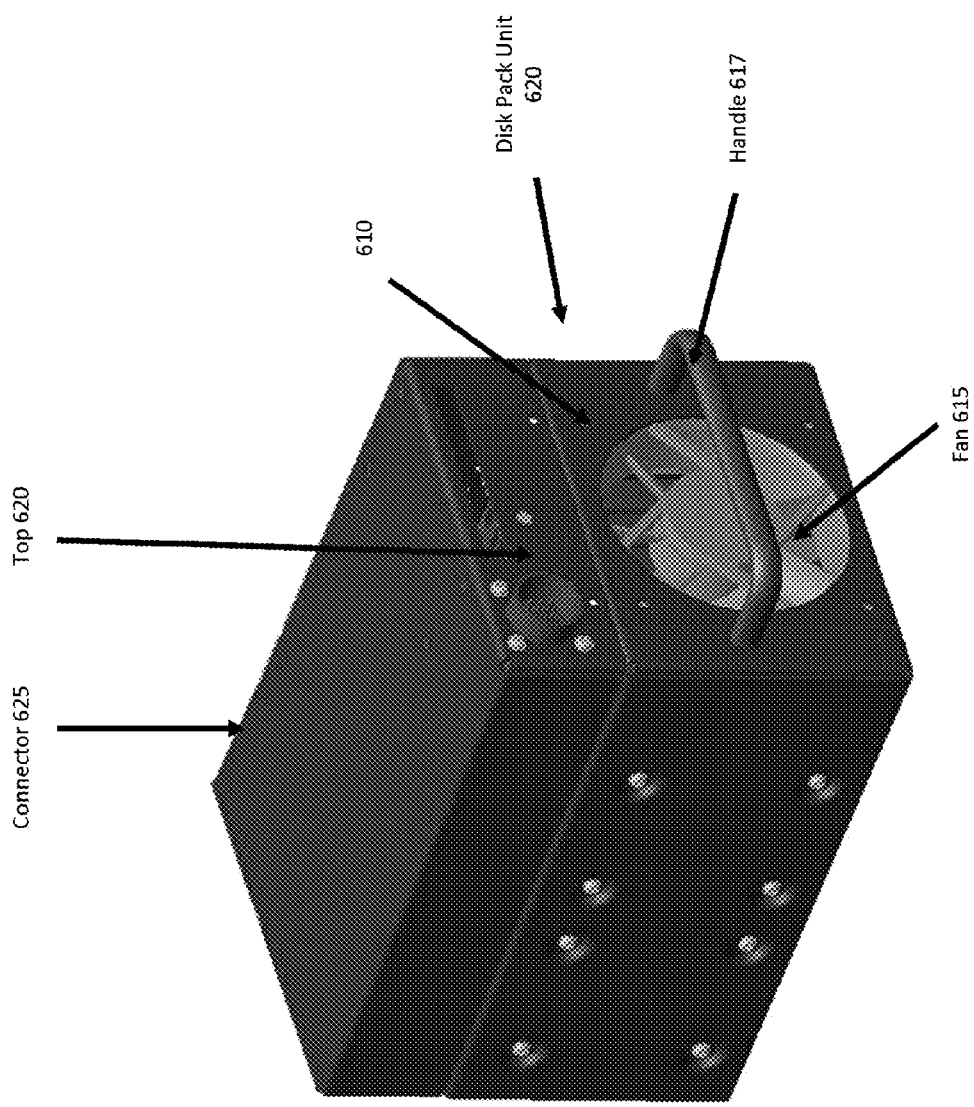
FIG. 6 is a perspective frontal view of an exemplary disk pack unit, according to the illustrative embodiment.
Figure 7:
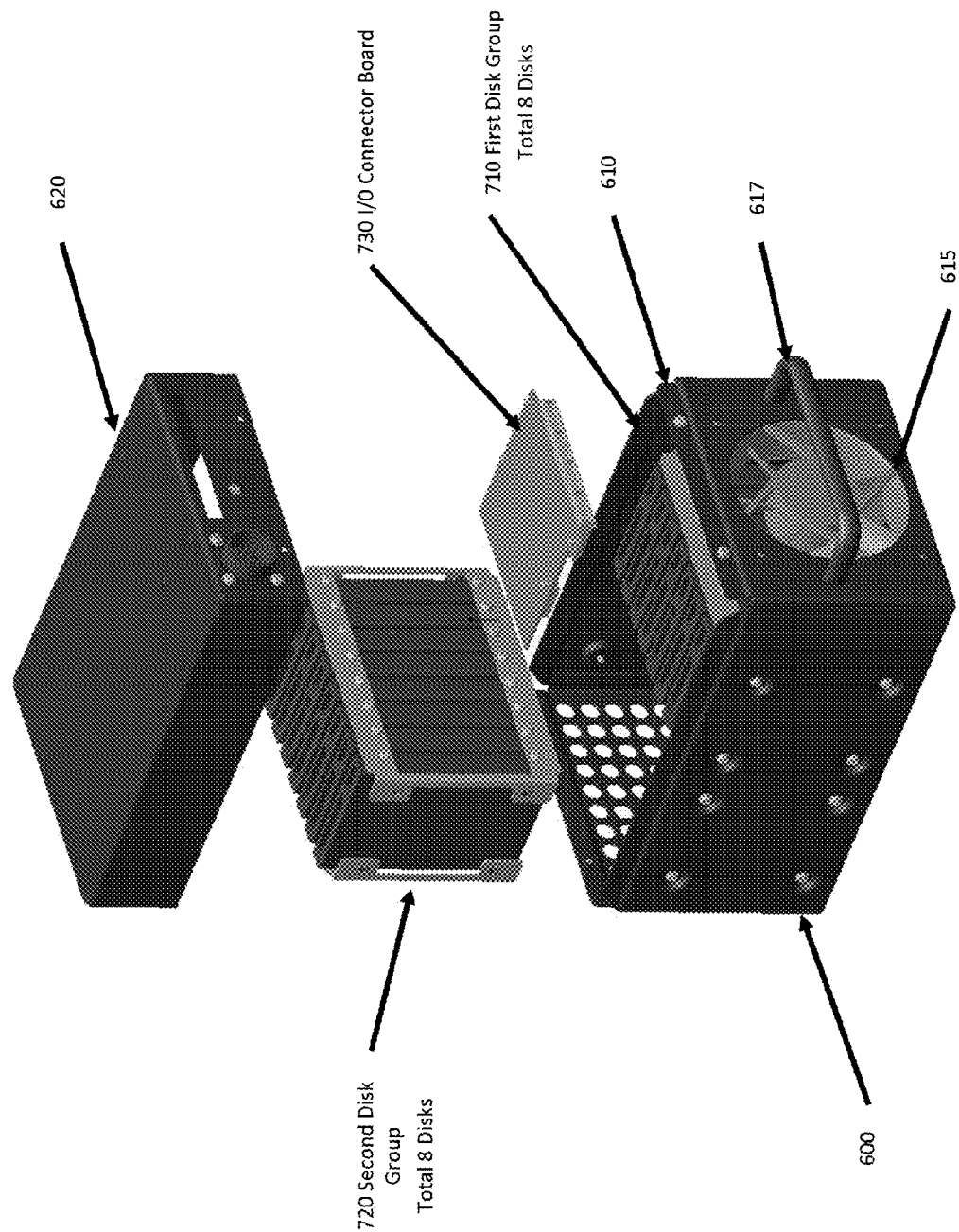
FIG. 7 is a partially exploded view of the disk pack unit, showing one disk group removed, with the disks arranged in a vertical orientation, according to the illustrative embodiment.
Figure 8:
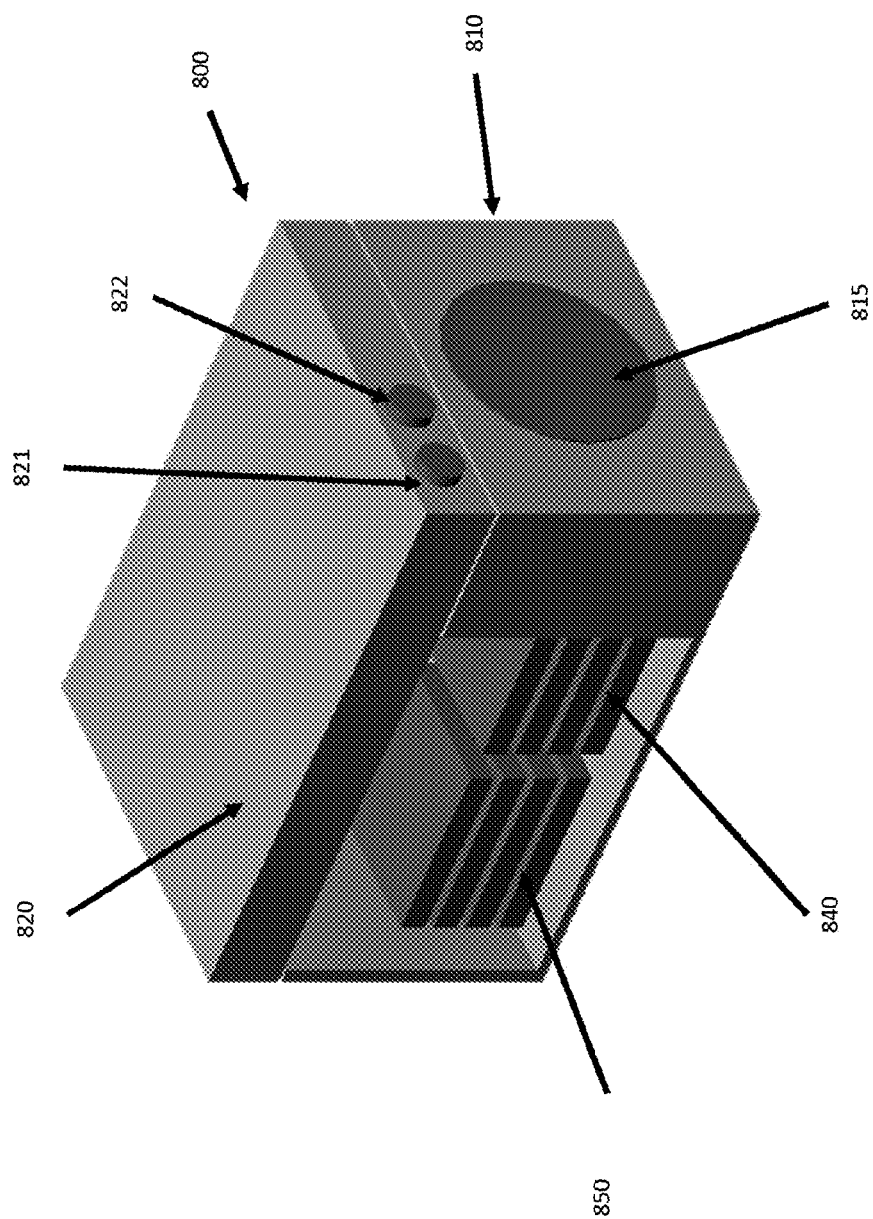
FIG. 8 is a partially cut-out perspective view of a disk pack unit with the disks arranged in a horizontal orientation, according to the illustrative embodiment.

Reference is now made to FIG. 6 showing a perspective frontal view of an exemplary disk pack unit 600, according to the illustrative embodiment. The disk pack unit 600 includes a bottom portion 610 and a top portion 620. There is also provided a fan 615, as described herein for the desired cooling of internal components, as well as a convenient carrying handle 617. The connector 625 is shown, which provides the desired power and disk signalling. FIG. 7 is a partially exploded view of the disk pack unit, showing one disk group removed, with the disks arranged in a vertical orientation, according to the illustrative embodiment, in which airflow is provided between the disks. In accordance with this embodiment, a first disk group 710 is shown with the disks in a vertical orientation, and the second disk group 720 is shown removed from the disk unit 600. The input/output (I/O) connector board 730 is also shown. FIG. 8 is a partially cut-out perspective view of a disk pack unit with the disks arranged in a horizontal orientation, according to the illustrative embodiment. As shown, there is a disk pack unit 800 that includes a bottom portion 810 with a fan 815 and a top portion 820. The top 820 has the connectors 821, 822 for the disk groups 840, 850. These disks are shown in a horizontal arrangement, in which the airflow is provided between the disks horizontally.

Figures 9, 9A:
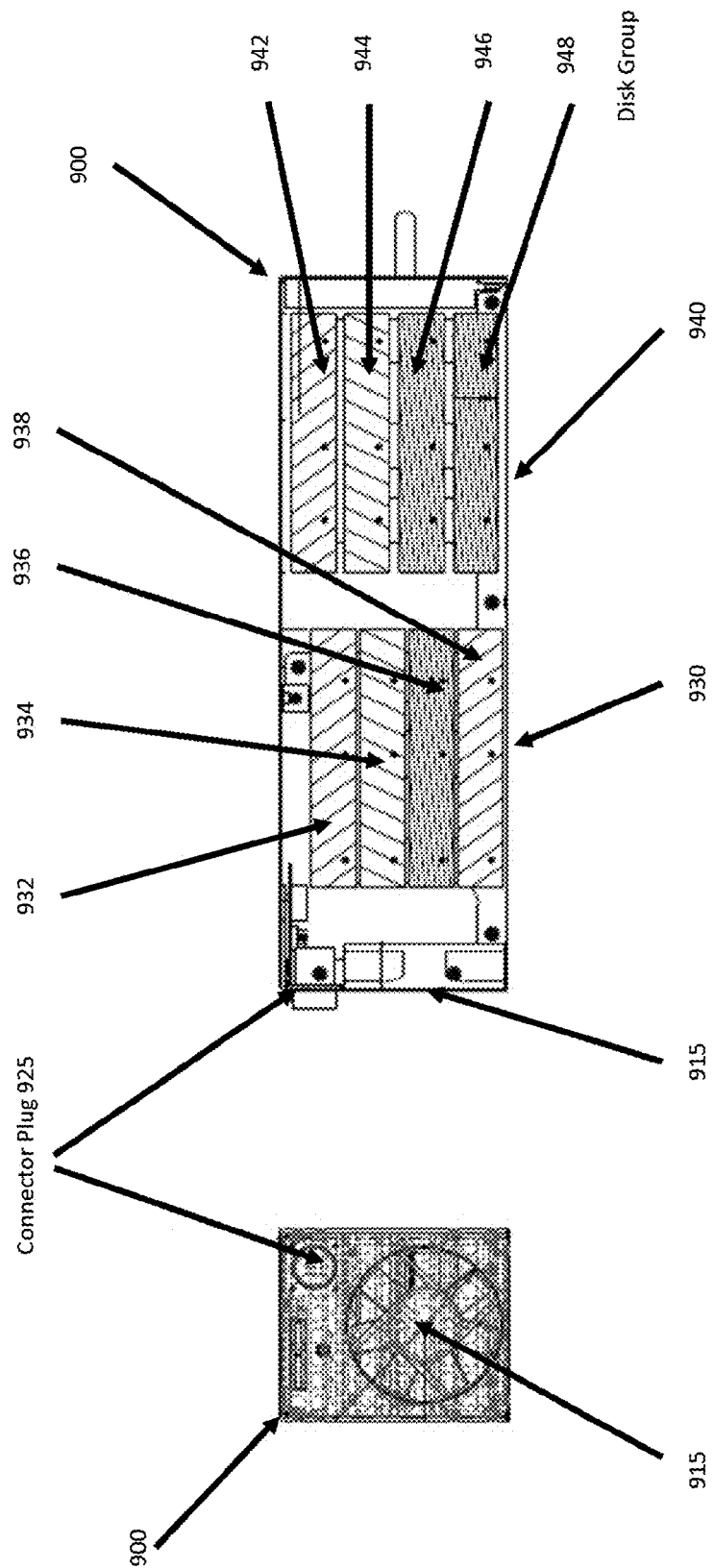
FIG. 9 is a front view of a disk pack containing eight disks, according to the illustrative embodiment.
FIG. 9A is a cross-sectional view of the disk pack as taken across line 8-8 of FIG. 9, according to the illustrative embodiment.

Reference is now made to FIGS. 9 and 9A showing the disk pack unit including horizontally oriented disks in greater detail. FIG. 9 is a frontal view of a disk pack unit 900 including a disk pack fan 915 and showing the connector plug 925 for power and disk signaling. FIG. 9A is a cross-sectional view of the disk pack as taken across line 8-8 of FIG. 9, according to the illustrative embodiment. As shown, there is a first disk pack group 930 including four horizontally oriented disks 932, 934, 936 and 938, and a second disk pack group 940 containing four horizontally oriented disks 942, 944, 946 and 948. The disks are 3.5" media disks according to an illustrative embodiment, and are mounted horizontally with airflow provided between the disks. In an illustrative embodiment, an external 12V and 5V DC power is supplied through the power connector 925, and eight lanes of SAS/SATA are provided by the two disk connectors. In alternate embodiments a differing voltage (e.g. 42-48 VDC) can be provided, as it can be beneficial to employ a higher voltage within the disk pack to allow reduction of wire size and improve voltage control by the power supply.

Figure 10:
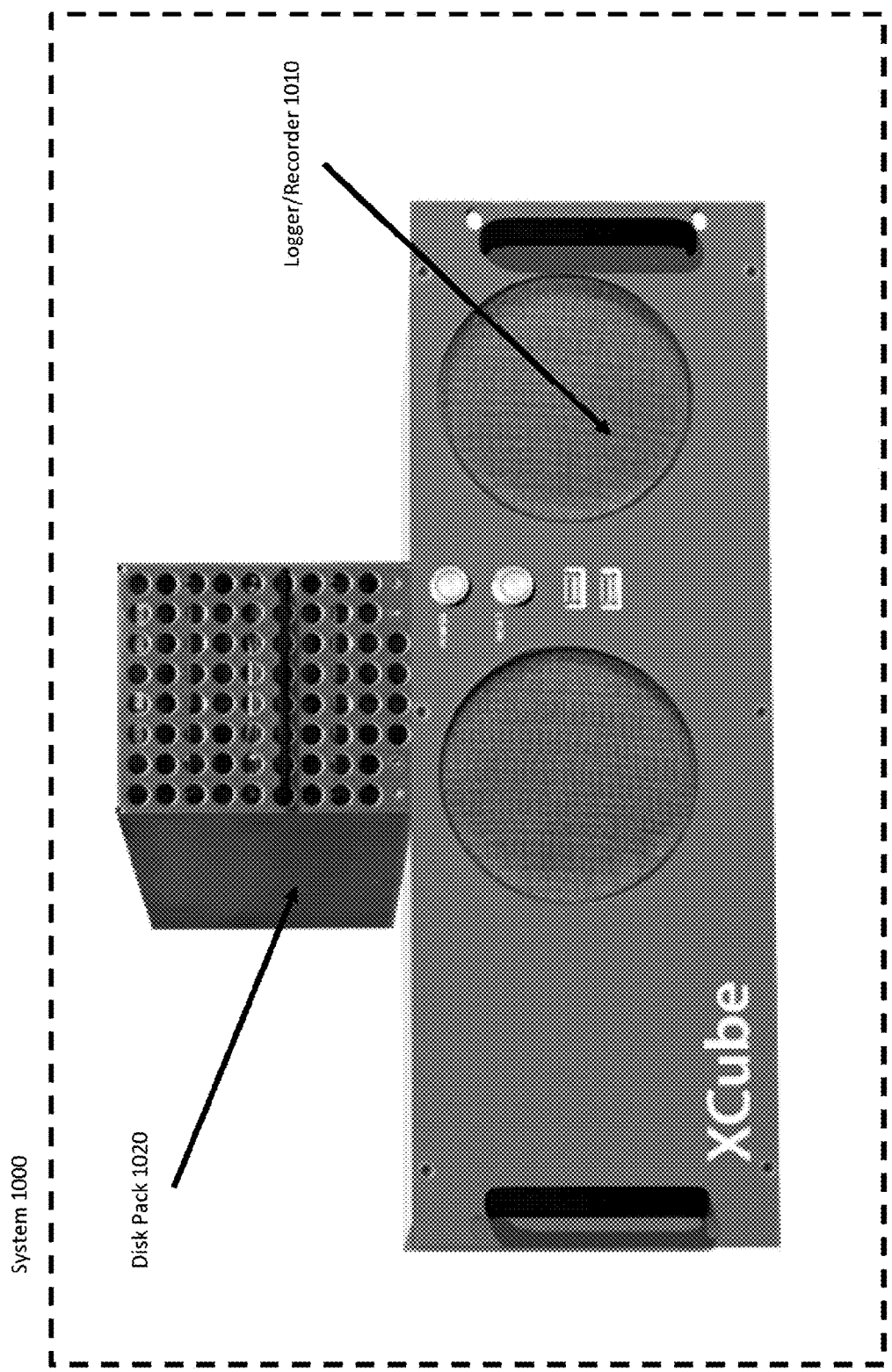
FIG. 10 is a perspective view of a recorder unit and a single associated disk pack, according to the illustrative embodiment.
Figure 11:
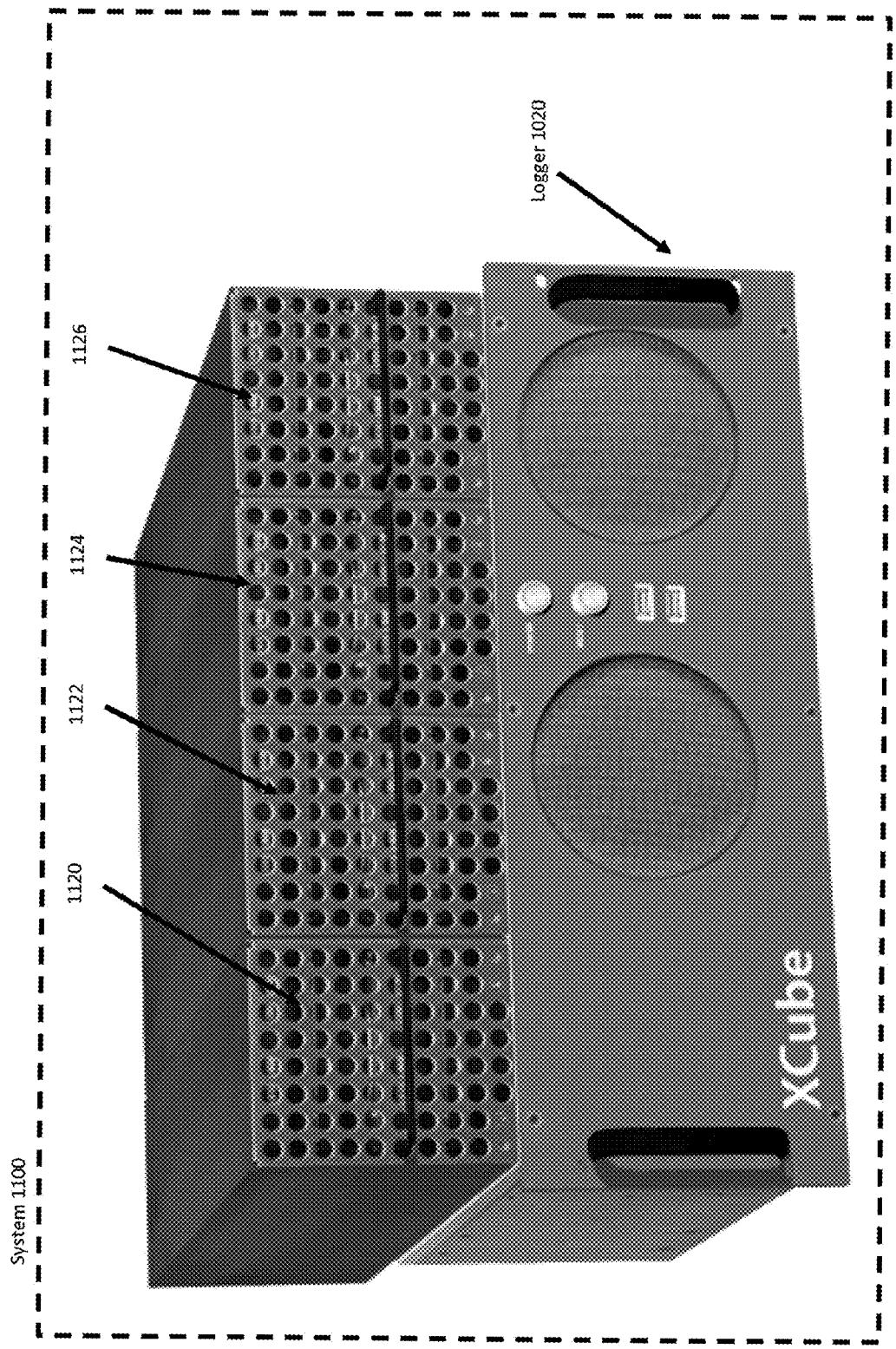
FIG. 11 is a perspective view of a recorder unit and four associated disk packs, according to the illustrative embodiment.
Figure 12:
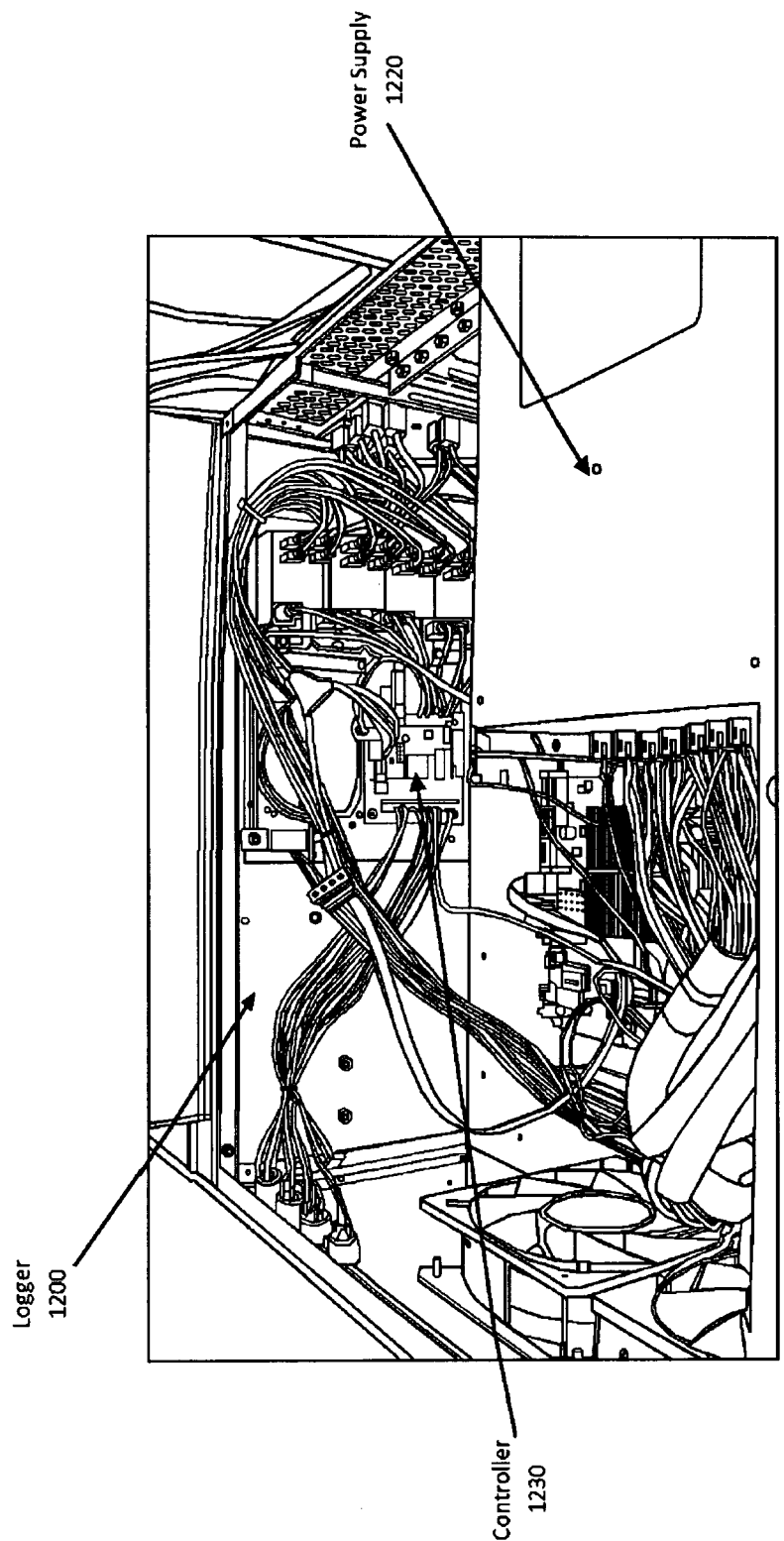
FIG. 12 is a top view of a recorder unit with its top cover removed, showing the controller and relay pack, according to the illustrative embodiment.

Reference is now made to FIG. 10 showing a perspective view of a recorder unit and a single associated disk pack system 1000, according to the illustrative embodiment. As shown, the control (recorder) computer 1010 is operatively connected to a disk pack 1020 though the standard connections as shown and described herein. FIG. 11 is a perspective view of a recorder unit and four associated disk packs system 1100, according to the illustrative embodiment, and showing improved airflow management as well as a unit chassis and power controller. The recorder unit 1110 has a built-in chassis controller (1230 shown in FIG. 12) that monitors temperature and controls the fans to optimize temperature and airflow (sound level) for the chassis unit. The chassis as an option can also include optional equipment to address either (or both) high and low temperature operation. Illustratively, in low temperature operation it is typically desirable to pre-heat the chassis and vent-off any condensation and ice-buildup before the main system computer board (main board) is powered up. This can be accomplished using conventional heater elements located (for example) below the main computer board that apply heat to the inside of the chassis while the system's fans run at very low speed to expel any water vapor. This approach both addresses the problem of condensation on the main board and also elevates the system chassis internal temperature to a safe level for operating commercial electronics (i.e. roughly 0 degree Celsius). The control unit 1110 also controls the power to the disk packs, and takes input from the recorder ("logger") software and front panel buttons. The power buttons 1130, 1132, 1134, 1136 for the respective disk packs 1120, 1122, 1124, 1126 are shown on the recorder unit 1110. FIG. 12 is a top view of a recorder unit 1200 (also recorder 1110 of FIG. 11) with its top cover removed, showing the controller 1230 and relay pack 1220, according to the illustrative embodiment. The relay pack physically controls power to the disk packs, through appropriate connectors. For example, on a PCIe disk controller card attached to the main board. Alternatively, internal and/or external SATA connectors can be employed.

Recorder Logical Structure

Figure 13:
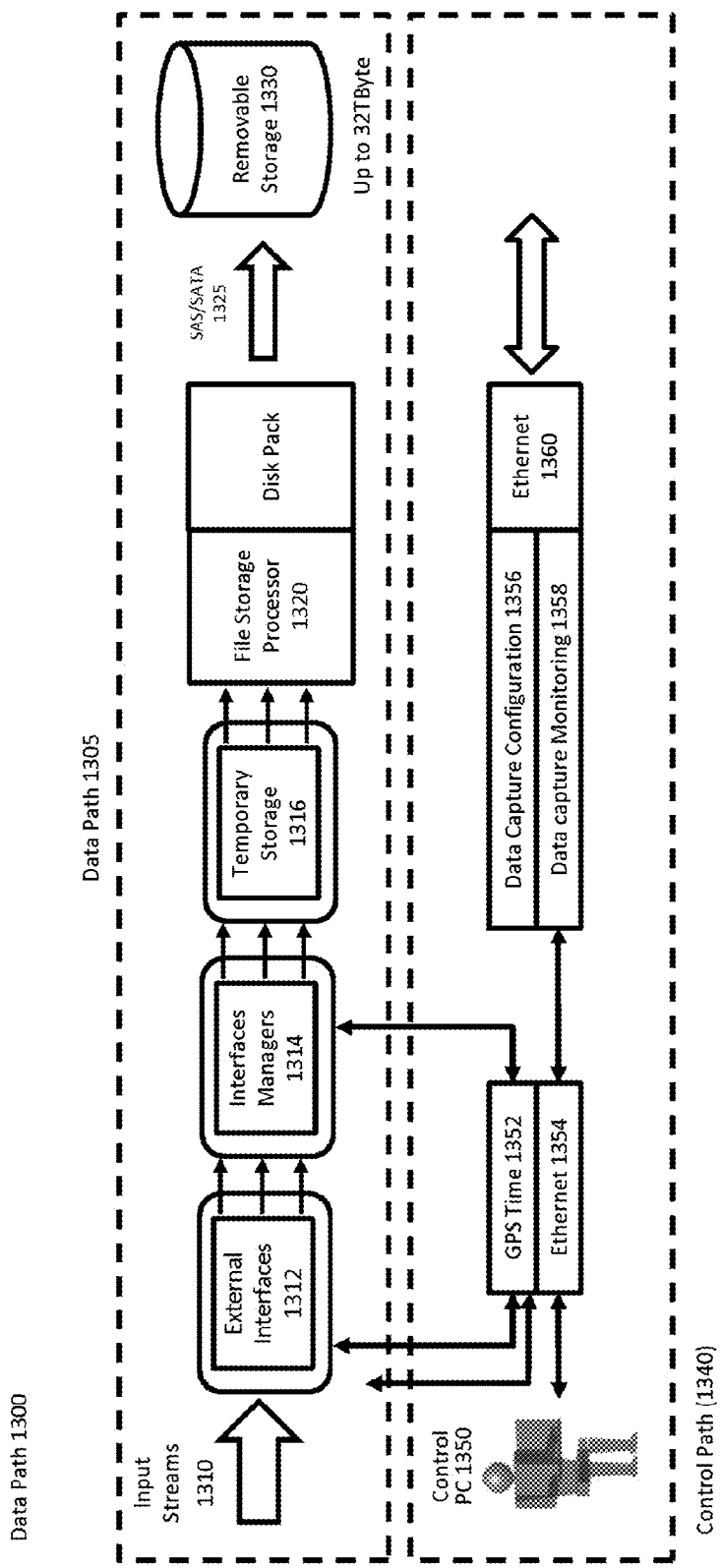
FIG. 13 is a logical design flow diagram of the recorder data path and the control path, according to the illustrative embodiment.

Reference is now made to FIG. 13 showing a logical design flow diagram of the recorder data path and the control path, according to the illustrative embodiment. Logically, the recorder software is organized into two major components: the data path and the control path. The data path is optimized for minimal involvement of operating system or management software, while the control path is designed for setup and control of the system. With reference to FIG. 13, the logical design flow diagram 1300 is shown, and shows the data path 1305 and the control path 1340. In the data path 1305, input streams of data 1310 are received into the external interfaces 1312. This data goes to the interface managers 1314 and to temporary storage 1316. A file storage processor 1320 then takes the data and through SAS/SATA connection 1325, the data is stored in removable storage 1330 (which is the disks as described herein). This processor is typically represented by the disk write side of the stream buffers. The data is managed by the Disk Write Scheduler and the disk managers. At this level the disk managers use the disks as regular file systems and regular files on the file systems. In general, the writing of data to the disks is performed by the operating system and is independent of the fact that the files reside on different individual disks. This improves efficiency and also makes the disks portable (i.e. readable on other computers having the same generalized software load). In operation, the system sets up data files on separate individual disks and sets the stored data chunk size to be optimal to that individual disk. The operating system and the underlying file system drivers efficiently transfer the data from system memory to the file, regardless of the particular operating system and/or explicit file system that is used on that disk.

The control path 1340 commences with the control computer 1350 (such as a recorder or logger computer) in communication via Ethernet 1354 with the data capture configuration 1356 and data capture monitoring 1358. GPS time is also provided to the external interfaces 1312 and interface managers 1314 by the control path 1340. The data capturing configuration 1356 and data capture monitoring 1358 is provided through the Ethernet connection 1360. During capture or acquisition of data, the upper data path 1305 is active, while the lower control path 1340 is used for setup and control.

Applications

It should be apparent that there are numerous applications for which the disk pack units and associated systems and methods can be employed. Once such application is for the set-up of autonomous vehicles. In developing the guidance systems for such vehicles, the system must accurately capture the world around the vehicle to be able to reproduce the actual world that the vehicle observers (with on-board vehicle sensors, such as forward looking camera, forward, side and backward looking radars, LIDAR systems and others) at that moment. This information is then used to decide if the vehicle systems themselves performed correctly. This is typically termed a ground truth system. As part of the development process, the raw sensor data from the on-board vehicle sensors is gathered and stored so that it can be accurately be reproduced at a later stage. Clearly, the amount of information that is received from sensors during the development process (setup) for controlling an autonomous vehicle is enormous. Only with a massive amount of data can the sensors build a picture of the overall environment. An AI-based solution enhances the sensor information to produce virtual sensor that will help control the vehicle. Notably, the ISO 26262 standard, and other regulations for safety-critical systems for autonomous control, as well as applicable industry standards, dictates that at least 10 years of actual driving data be collected and verified to be correct in order to certify an autonomous vehicle. This requirement leads to a storage need of up to 150 PetaBytes (PBytes) of data. The recording requirement of the reference data and the vehicle sensor data can be up to several GByte/s of continuous recording (e.g. 8 GB/s). The illustrative system is capable of satisfying both the speed and scale of such storage. More particularly, by using the individual, self-sufficient processor units, the user can start with one disk pack unit, and expand (scale) to several hundred units as so desired. The disk pack unit is defined by the software interface, and the behavior is one hundred percent independent of the hardware. By way of example, since the disk packs are field replaceable, each 32-GByte pack (for example) can be readily replaced in the field. In an illustrative embodiment, four packs, equaling 128 TByte can be currently attached to the system at a given time. This is exemplary of a wide range of possible storage sizes and/ numbers of connectable packs. When full, packs can be transferred to a distributed storage and simulation cluster. This cluster can store up to 150 PByte of data scalable from as little as 144 TBytes.

Real-Time Streaming

Packet size mismatch can be addressed by bundling many small packets from the input side into larger packets suitable from writing to disk within the stream buffers. Response time of the disk subsystem is address, faster input bursts are enabled by providing large buffers in recorder memory, so that it can record at maximum machine speed to memory and trickle data (in suitable chunks) out at disk array speed. Any mismatch in packet size can be addressed, illustratively, by the stream buffers, which assemble many small packets from the real-time interface size to a large chunk on the stream side of the disks. The operating system interference, hardware driver availability is addressed, and responsiveness of recording capability is increased by using an off-the-shelf operating system. By constraining the operating system from using more than one (or a plurality) of the CPUs in the system the interference to the real-time streams of data can be minimized, and modifications to the operating system itself can be avoided while still ensuring real-time responsiveness of the data path. The memory subsystem responsiveness is addressed by making sure that the stream buffer storage is always available in main memory, by preventing the buffers from being swapped to the disk. This prevention is performed, illustratively, either by managing the memory using system resources i.e. by preventing the operating system from having access to the memory, or by allocating the memory using the operating system, locking the pages to hardware memory. The buffers, after locking the pages to memory, can then be internally managed by the buffer manager (i.e. stream buffers). This arrangement is fully compatible with modern operating systems.

More generally, on the storage side, the scheduler of the system employs identifiers, such as packet numbers or timestamps to identify the ordering of packets from the original data stream received from the streaming source. Alternatively, another method can be employed to mark the data packets. On the read side, the scheduler can allow the system to replay the stored data at an "arbitrary" speed close to the aggregate speed of all individual disks that the stream is stored on, by reading from the disks in parallel to the stream buffers and assembling, on the output side of the stream buffers, the original data stream using the know identifiers for packets, which provide a "map" for the reconstruction of the original data stream.

To reliably stream data through a "standard" system there are at least two technical innovations. The first observation is addressing the decoupling of incoming data streams from outgoing data streams to the disk-array while accounting for indeterminism in system response. In general there is a continuous or small packet based input stream at high packet rate, while the disk array need huge packet size and low packet rate, and the system (especially on the disk side sometimes has a very long response time (10-100 ms or more). By letting the input data streams write to large elastic stream buffers that are large enough to allow the input interfaces produce data independently of the disk-writes, it is possible to decouple the time indeterminism and response times form the input streams.

To address the mismatch of optimal packet size between input streams and disk-streams the stream buffers are organized as a set of smaller blocks (slots) that correspond to a suitable sized chunk to write to disk. Typically a disk chunk is sized to be slightly less than the size of the write cache of the disk (8-32 MByte with existing disks 2011). Each stream buffer is sized so that there are enough slots available to keep the disk system busy (one buffer minimum per available disk, so if there are 16 disks there need to be more than 16 slots in the buffer). The constraint on number of slots in each input buffer is relaxed if there are several input streams. An alternative approach to having fixed sized slots, the stream buffers can be organized as (circular) FIFO buffers, where the read side of the buffer reads, data out of the buffer in suitable chunks (looking at the amount of data available to read from the buffer). This alternative scheme is slightly more complex in software, but reduces the potential waste of memory by the slots-size and input packet size not being evenly dividable.

The second observation addresses indeterminism in operating system and computer response. In order to provide a standard programming environment we let the full operating system be available on the machine, but it is constrained to only use a certain CPU or a couple of CPUs this is enough to provide a reasonable responsive user interface, allows for off the shelf drivers and software, but leaves the other CPU (cores) available for handling input and output tasks.

Using an off-the-shelf operating system such as Linux or Windows the task of finding suitable I/O boards and handling disks and user interfaces becomes easy due to the fact that they are industry standards and all board vendors provide a board and driver for at least one of the operating systems.

An important aspect of the stream buffers is that in order to ensure response time and provide reliable memory mapping between the processes implementing the system the stream buffer memory need to be "pinned" to physical memory in the machine. This removes the possibility of memory being swapped out to disk, and by doing so severely affect memory performance. An alternative to "pin" buffer virtual memory to physical memory is to turn off swap entirely from the machine. This is a technique that also works, but may affect the normal operation of the operating system, that may need this ability. The OS-Swap effect can be contained by using a system disk that is not part of the data collection disks, and the operating system being locked to specific CPU(s). This is optional in various embodiments, but serves to improve system responsiveness and the determinism of the response.

Infinite Time Streaming Data to Disk

A challenge with continuously recording data over a long time disks will eventually fill up, and in theory require a disk pack change. A normal operating system will get confused when un-mounting a large set of disks at once. There is also power (high current) problem with a large number of disks attached to one computer when they spin up. The spin up of a disk pack requires 2-3 times as much current than required by the disks operating normally. The problem with either one large set of disks and the problem with a need to be able to exchange large loads such as disk-packs during an active capture easily create power glitches in the recorder with a system crash (or lost disk write data) as a consequence. In addition when mounting and un-mounting a disk pack the disks will have to be dismounted by software to ensure that the operating system has released the disks and properly closed all open handles on the disks, then the power can be shut down and disk removed. The reverse operation need to be followed when attaching a new disk pack to the system. In addition to the un-mount process another challenge arises with the fact that the disks will not necessarily be mounted in order, thus there need to be a mechanism to find out what disks belongs to which array.

The industry solution to these challenges is to let the host computer use the power control on individual disks and then programmatically spin them up as needed. This works in a custom environment since the disks need to be programmed to perform this operation and then stay in power up or down. In a generic environment this can't be guaranteed.

By allowing multiple disk packs simultaneously connected to the system, one disk pack can be active while one or more disk packs are inactive on standby, to be activated when needed. In order to control power (current surges) the power to each disk pack is controlled programmatically for the group of disks in a disk pack. This enables the disks to be untouched in terms of factory settings and no special control for the disks is needed. To address these issues, the excessive power consumption and current surges at startup are addressed. The recorder physically controls the power to the disk packs so that when the system starts the disk packs are initially powered down. This allows the computer to boot first, then the disk packs are brought up one at a time when they are needed, and powered down when they are not. In an alternate embodiment, when a small number of disk packs are attached to the system, it can employ a very large power supply that is capable of handling the abusive power drain encountered spinning up 16 or 32 disks simultaneously. Illustratively a large amount of 12V power is made available. In an example of a system operating free of a controller a 1200 W power supply capable of 100 Amp of 12V output, can be employed as an alternative to the disk controller.

The systems and methods herein have various advantages apparent to those having ordinary skill. The system is defined by software and has minimal dependencies making it supportable over time and implementation technologies. The system is able to support any file system as well as a mix of file systems on a single disk. Currently SATA/SAS interface is supported, as well as EXT4, NTFS is supported, but not limited to those. The file-system on the disks can read and write to it, and the external disk interface is constructed and arranged so that the disk controller can attach to it, and provide a driver to the operating system. Multiple implementations and organizations or disk packs are supported and enabled by using an external interconnect. Thus, disks are separated from the recorder, and accordingly that can have any form factor and organization. The input can be from any interface supported by the operating system. Customer interfaces can be written for devices using the operating system tools. Thus, there is no need to write the interface from scratch. The system is scalable in performance as the hardware develops. The software is easily ported to new platforms. The system accommodates up to 4 GByte/s recording is obtainable with the hardware used, as well as burst data rates of up to 12 GByte/s is obtainable, which is limited by memory speed. The system is also deployable in real world environments, as it is resilient to faults in the disk subsystem, high altitude operation, and small and rugged packaging. Other various advantages should be apparent to those having ordinary skill in the art.

Moreover, the illustrative embodiments essentially replace a computer backplane with a relatively inexpensive cabled interconnect between the system and the disk packs. In addition, the software scheduler scheme (which can be any arrangement that performs such functionality in addition to a traditional "scheduler") to provide data to disks according to their capability, and thus deal with disks that are slow or failing (without losing overall system performance). Likewise, the illustrative embodiments allow for the use of an array with any mix of disks (in terms of size and performance) whilst aggregating the performance of all disks in the array, thus abrogating the need for an array of similar or identical disks.

Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the illustrative embodiments shown and described herein have been in relation to, primarily, a disk pack unit containing eight disks. However, it is expressly contemplated that any number of disks can be employed, typically 8-16 disks, however up to 32 disks, or even more, can be employed within ordinary skill. Also, the technique for stacking or packing disks within the box or other enclosure is highly variable as is the technique for connecting disks to a communication bus. In various embodiments, disks can be stacked horizontally so that the thin dimension is vertical, or can be staked vertically, so that the thin dimension is horizontal. Additionally, locational and directional terms such as "top", "bottom", ""enter", "front", "back", "above", "below", "vertical", "horizontal", "right", "left", and the like should be taken as relative conventions only, and not as absolute. Accordingly, this description is meant to be taken only by way of example, and not to otherwise limit the scope of this invention.

What is claimed is:

1. A system for high speed, high-volume data storage from a data source comprising:
   an array of disks interconnected controlled by a scheduler that assembles and directs streaming write of data packets to each of the disks across the array at a high speed as disks become available to receive the data packets, the array of disks including at least one disk having at least one of (a) a differing size and (b) a differing write performance with respect to another disk of the array to define an arbitrary collection of disks in the array; and
   a control computer having an operating system and a file system that interacts with the scheduler, the controller being connected by cables to the array of disks,
   wherein the scheduler is constructed and arranged so that, in presence of a failure of at least one of the one of the disks, writing of data continues to other unfailed disks of the array free of any influence on write performance of the other unfailed disks by the failed disk, and further constructed and arranged to multiplex the steaming write of data using stream buffers over an arbitrary number of individual disks in the array free of influence of write performance of any disk in the array on write performance of any other disk in the array.

2. The system as set forth in claim 1 wherein each of the stream buffers is constructed and arranged to vary so as to buffer sufficient data for write to each of the disks in the array in a manner that an input data stream from the data source is fully written to the array irrespective of input data stream size.

3. The system as set forth in claim 2 wherein the stream buffers are constructed and arranged to buffer the data stream in bursts of larger data stream size for a burst time interval in which a time before and after the burst time interval are defined by a smaller data stream size.

4. The system as set forth in claim 2 wherein the stream buffers are constructed and arranged to cache the data stream within a predetermined time interval and write the data to the array in a second, longer time interval.

5. The system as set forth in claim 4 wherein the stream buffers are constructed and arranged to cache at least approximately 1 GByte of data.

6. The system as set forth in claim 2 wherein the scheduler is constructed and arranged to enable reading the disks in parallel to the stream buffers and, at an output of the stream buffers, assemble the data stream therefrom so as to read the assembled data stream.

7. The system as set forth in claim 6 wherein the scheduler is constructed and arranged to enable reading of the assembled data stream at a speed that is based upon an aggregate speed of all the disks in the array.

8. The system as set forth in claim 6 wherein the scheduler is constructed and arranged to use identifiers associated with the data packets and reassemble the data stream therefrom.

9. The system as set forth in claim 1 wherein the cables include conventional data storage cable connectors.

10. The system as set forth in claim 9 wherein the connectors comprise at least one of SATA and SAS connectors.

11. The system as set forth in claim 10 wherein the connectors are interconnected with a disk controller operatively connected to a main board on the controller.

12. The system a set forth in claim 11 wherein the control computer comprises a general purpose computer having a commercial operating system and commercial file system.

13. The system as set forth in claim 1 further comprising stream buffers that direct the data into chunks for storage in each of the disks.

14. The system as set forth in claim 1 wherein the array of disks is stored is a discrete portable box enclosure remote from the control computer.

15. The system as set forth in claim 14 wherein the box includes a compressor to maintain a leaky pressurized environment therein.

16. The system as set forth in claim 14 wherein the portable box enclosure includes a temperature control element.

17. The system as set forth in claim 1 wherein the array of disks is enclosed in each of a plurality of portable box enclosures, each interconnected by a cable to a port on the control computer.

18. The system as set forth in claim 17 further comprising another control computer constructed and arranged to removably, operatively connect to the array of disks in at least one of the portable box enclosures and read data from the connected array of disks.

19. The system as set forth in claim 1 wherein array of disks is connected by a discrete power cable to at least one of (a) the control computer and (b) a remote power supply.

20. The system as set forth in claim 1 wherein the scheduler is constructed and arranged to read a disk failure during the write and to shut down further write to the disk.

21. A method for writing and reading a high-speed stream of data from a source comprising the steps of:

assembling and directing, with a scheduler, streaming write of data packets to each of a plurality of stream buffers that are associated with an array of storage disks, the stream buffers being selected based upon availability of the associated storage disks, the array of disks including at least one disk having at least one of (a) a differing size and (b) a differing write performance with respect to another disk of the array to define an arbitrary collection of disks in the array; and interacting with an operating system and a file system on a control computer to direct write operations to each of the disks;

in presence of a failure of at least one of the one of the disks, operating the scheduler to continuing writing of data other unfailed disks of the array free of any influence on write performance of the other unfailed disks by the failed disk; and operating the scheduler to multiplex the steaming write of data using stream buffers over an arbitrary number of individual disks in the array free of influence of write performance of any disk in the array on write performance of any other disk in the array.

* * * * *